US009177094B2

(12) United States Patent
Zhao et al.

(10) Patent No.: US 9,177,094 B2
(45) Date of Patent: Nov. 3, 2015

(54) AUTOMATIC MAPPING METHOD FOR A DISTRIBUTION NETWORK BASED ON LOGICAL LAYOUT

(71) Applicants: State Grid Corporation of China, Beijing (CN); State Grid Suzhou Power Supply Company, Suzhou (CN); NARI Technology Co., Ltd, Nanjing (CN); Jiangsu Electric Power Company, Nanjing (CN)

(72) Inventors: Jiaqing Zhao, Suzhou (CN); Jianguo Yao, Nanjing (CN); Chunlei Xu, Nanjing (CN); Haodong Shen, Nanjing (CN); Haibing Zhu, Nanjing (CN); Kejun Qian, Suzhou (CN); Zemie Dai, Nanjing (CN); Xuesong Huo, Nanjing (CN); Jiang Tian, Suzhou (CN); Hongwei Du, Nanjing (CN); Huiqun Li, Nanjing (CN); Bing Bing Shen, Nanjing (CN); Hongen Ding, Suzhou (CN); Hong Yang, Suzhou (CN); Chun Li, Suzhou (CN); Yang Lv, Suzhou (CN)

(73) Assignees: State Grid Corporation of China, Beijing (CN); State Grid Suzhou Power Supply Company, Jiangsu Province; NARI Technology Co., Ltd., Jiangsu Province (CN); Jiangsu Electric Power Company, Jiangsu Province (CN)

( * ) Notice: Subject to any disclaimer, the term of this patent is extended or adjusted under 35 U.S.C. 154(b) by 0 days.

(21) Appl. No.: 14/248,114

(22) Filed: Apr. 8, 2014

(65) Prior Publication Data
US 2015/0012902 A1    Jan. 8, 2015

(30) Foreign Application Priority Data
Jul. 3, 2013    (CN) .................. 2013 1 02766171

(51) Int. Cl.
*G06F 17/50*    (2006.01)
*H02J 3/00*    (2006.01)

(52) U.S. Cl.
CPC .......... *G06F 17/5077* (2013.01); *G06F 17/509* (2013.01); *G06F 17/5081* (2013.01); *H02J 3/00* (2013.01)

(58) Field of Classification Search
CPC ........... G06F 17/5077; G06F 17/5081; G06F 17/509; H02J 3/00
See application file for complete search history.

(56) References Cited

U.S. PATENT DOCUMENTS 6,931,090 B2 *   8/2005   Chao et al. .................. 376/267
7,752,588 B2 *   7/2010   Bose ............................ 716/122
(Continued)

OTHER PUBLICATIONS

Popovic et al.; "Expansion planning of distribution networks using simulated annealing technique"; 21st International Conference on Electricity Distribution; Frankfurt; Jun. 6-9, 2011; pp. 1-4.*

*Primary Examiner* — Naum B Levin
(74) *Attorney, Agent, or Firm* — Stites & Harbison PLLC; Cong Ding

(57) ABSTRACT

The invention provides an automatic mapping method for a distribution network based on logical layout. The method includes: (1) pretreating a model of the distribution network model by analyzing it, and partitioning and striping the distribution network model to generate a plurality of partial models; (2) analyzing an automatic mapping algorithm to be utilized by comparing a distribution network graph obtained by the algorithm with the distribution network model; (3) achieving automatic layout of the partial models or the whole distribution network model on the basis of analysis of the automatic mapping algorithm to be utilized; and (4) analyzing and treating the automatic layout to achieve the generation of the distribution network graph with a desired practical effect.

2 Claims, 2 Drawing Sheets

(56) References Cited

U.S. PATENT DOCUMENTS

| | | | |
|---|---|---|---|
| 7,930,159 B1 * | 4/2011 | Florissi et al. | 703/13 |
| 7,949,947 B2 * | 5/2011 | Frei et al. | 715/239 |
| 8,155,943 B2 * | 4/2012 | Nasle | 703/18 |
| 8,161,550 B2 * | 4/2012 | Keen et al. | 726/22 |
| 8,190,299 B2 * | 5/2012 | Rovnyak et al. | 700/287 |
| 8,255,353 B2 * | 8/2012 | Zhang et al. | 706/52 |
| 8,509,955 B2 * | 8/2013 | Larsson et al. | 700/286 |
| 8,756,449 B2 * | 6/2014 | Shaffer et al. | 713/340 |
| 2008/0168017 A1 * | 7/2008 | Sreedhar et al. | 706/47 |
| 2008/0262820 A1 * | 10/2008 | Nasle | 703/18 |
| 2008/0263469 A1 * | 10/2008 | Nasle et al. | 715/771 |
| 2009/0083019 A1 * | 3/2009 | Nasle | 703/18 |
| 2011/0072012 A1 * | 3/2011 | Ah-Pine et al. | 707/725 |
| 2012/0181869 A1 * | 7/2012 | Chapel et al. | 307/64 |
| 2012/0185804 A1 * | 7/2012 | Dam | 715/853 |
| 2012/0239169 A1 * | 9/2012 | Smith et al. | 700/83 |
| 2013/0024168 A1 * | 1/2013 | Ilic et al. | 703/2 |
| 2014/0164664 A1 * | 6/2014 | Gong et al. | 710/305 |

* cited by examiner

AUTOMATIC MAPPING METHOD FOR A DISTRIBUTION NETWORK BASED ON LOGICAL LAYOUT

RELATED APPLICATIONS

This application claims priority to CN application no. CN2013102766171 filed Jul. 3, 2013, under 35 U.S.C. 119 (a).

FIELD OF THE INVENTION

This invention relates to an automatic mapping method for a distribution network.

DESCRIPTION OF THE RELATED ART

From the visualization of the power systems network topology, it can be seen that the automatic mapping algorithms generally comprise physical layout and logical layout. The typical method for the physical layout is geographic mapping method, which simply parses the geographic location information of nodes as corresponding layout coordinate. The geographical location mapping plays an important role in the visualization of the network topology associated with geographical location information. However, such a method requires a lot of initial geographical information data, while the distribution network graph generated by the method can not meet the requirements of definite tendency and clear topology.

Logical layout has a lot of advantages compared with geographical information mapping, for example, logical layout can distribute layout space for nodes as required, regardless of redundancy and interleaving of nodes on the actual geographical location. Most importantly, this method allows researchers to make full use of graph algorithms not associated with problem domains during the implementation of layout, and also allows the researchers to focus on the inherent characteristics of graphs. Logical layout is the core of mapping research, and very rich algorithms are generated in this mapping branch, such as, tree layout algorithm, ray layout algorithm, hierarchical layout algorithm, orthogonal layout algorithm, force-directed layout algorithm, hybrid layout algorithm and dynamic interactive layout algorithm. Furthermore, in some research the solving method of combination optimization problems is referred to solve the problems of graph layout, including genetic algorithm, simulated annealing algorithm and the like.

Many foreign research institutions and universities have done a lot of work on the automatic mapping of a distribution network, for example, CAIDA, Bell laboratories, the University of Melbourne, and University of Rome. However, during research the following problems are found out:

(1) in most layout algorithms for network topology visualization, the inherent characteristics of network topology of a power system are not fully considered and utilized, and only for some general layout algorithms the efficiency and layout effect are improved (2) the achievement of dynamic interactive layout is absent in the visualization research of existing network topologies.

Thus, during automatic layout mapping for a distribution network, the single layout mapping method can not meet the requirements of a distribution network.

SUMMARY OF THE INVENTION

An object of the invention is to provide an automatic mapping method for a distribution network, in order that this method can ensure that the mapping layout is beautiful, clear and reasonable.

For the above purpose, the following technical solution is utilized:

An automatic mapping method for a distribution network based on logical layout, for achieving automatic mapping of a distribution network graph of a power system, comprising steps of:

(1) pretreating a model of the distribution network by analyzing it, and partitioning and striping the distribution network model to generate a plurality of partial models;

(2) analyzing an automatic mapping algorithm to be utilized by comparing a distribution network graph obtained by the algorithm with the distribution network model, to find out a basis for purposefully improving the partial models or the whole distribution network model;

(3) achieving an automatic layout of the partial models or the whole distribution network model on the basis of analysis of the automatic mapping algorithm to be utilized by combining with one or more of a force-directed layout algorithm, hybrid layout algorithm, dynamic interactive layout algorithm and an improved grid routing algorithm in order to generate the distribution network graph; and (4) analyzing and treating the automatic layout to achieve the generation of the distribution network graph with a desired practical effect.

Preferably, the automatic mapping algorithm to be utilized is selected from a group comprising tree layout algorithm, ray layout algorithm, hierarchical layout algorithm, orthogonal layout algorithm, force-directed layout algorithm, hybrid layout algorithm, dynamic interactive layout algorithm, genetic algorithm, and simulated annealing algorithm.

More preferably, the method further comprises finding out the optimum CIM model (common information model) associated with the automatic layout on the basis of existing CIM models before analyzing and treating the automatic layout.

Due to the above technical solution, the invention has the following advantages compared with the prior art: in the automatic mapping method for a distribution network of the invention, the inherent problems of the distribution network are considered, and the automatic mapping of the distribution network is achieved on the analysis of the distribution network by combining with multiple mapping algorithms, this can ensure that the layout of the automatically generated distribution network graph is beautiful, clear and reasonable, so that the distribution network graph can greatly improve the efficiency of daily work of the distribution network and the maintenance of distribution network data.

DESCRIPTION OF THE PREFERRED EMBODIMENTS

Figure 1:
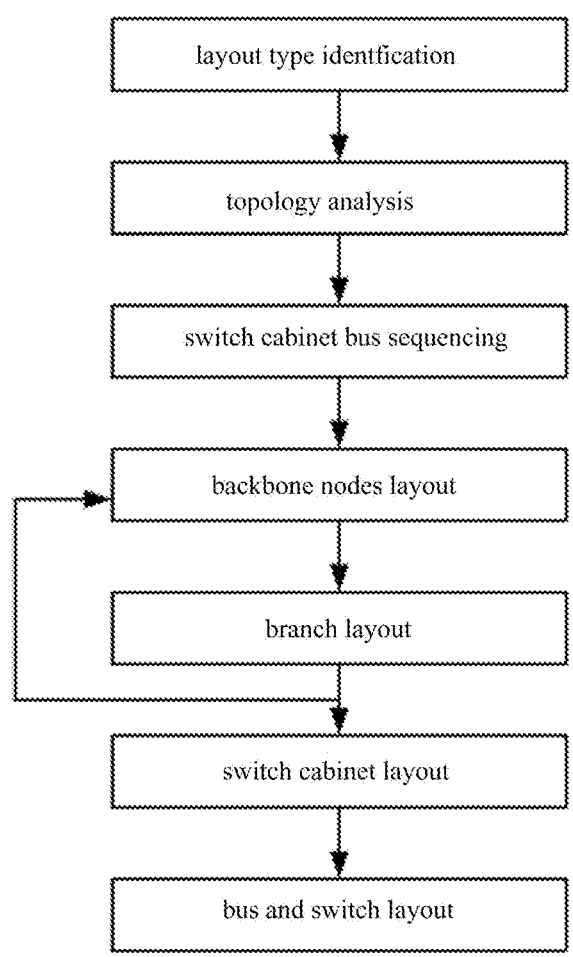
FIG. 1 is a flow chart of automatic layout of the automatic mapping method for a distribution network based logical layout according to the invention.

The present invention will be described hereinafter with reference to the accompanying drawings. It is to be noted, however, that the drawings are given only for illustrative purpose and therefore not to be considered as limiting of its scope, for the invention may admit to other equally effective embodiments.

Embodiment 1

Due to complicated lines, a huge number of devices, and frequent changes of topology of a distribution network, mapping of the distribution network may mean a lot of work and may not be real-time, and thus the maintenance and usage of a distribution network graph are complicated. There are some disadvantages in existing mapping methods of a distribution network, for example, low accuracy and poor reliability. Considering the above problems, the invention provides an automatic mapping method for a distribution network based on logical layout, for achieving automatic mapping of a distribution network graph of a power system.

This method comprises the following steps:
  (1) pretreating a model of the distribution network by analyzing it, and partitioning and striping the distribution network model to generate a plurality of partial models.
  (2) analyzing an automatic mapping algorithm to be utilized by comparing a distribution network graph obtained by the algorithm with the distribution network model, to find out a basis for purposefully improving the partial models or the whole distribution network model.
  (3) finding out the optimum CIM model associated with the automatic layout on the basis of existing CIM models.

Various descriptions of topology are provided in different versions of CIM. In the latest version of CIM, the description of relevant layout graph is provided. The optimum CIM model associated with the automatic layout is found out on the basis of existing CIM models.

(4) achieving automatic layout of the partial models or the whole distribution network model on the basis of analysis of the automatic mapping algorithm to be utilized by combining with one or more of a force-directed layout algorithm, hybrid layout algorithm, dynamic interactive layout algorithm and an improved grid routing algorithm in order to generate the distribution network graph.

The automatic mapping algorithm to be utilized is selected from (but not limited to) tree layout algorithm, ray layout algorithm, hierarchical layout algorithm, orthogonal layout algorithm, force-directed layout algorithm, hybrid layout algorithm, dynamic interactive layout algorithm, genetic algorithm, and simulated annealing algorithm.

Force-directed algorithm: the attractive force and repulsive force are calculated to get a resultant force, and the location of nodes is changed by means of the resultant force. After the above process is performed one time, new energy value is calculated according to the new location of the nodes. The smaller the energy value, the more stable the whole network, and the configuration display of the network graph is clearer. When the energy value achieves the minimum value, the configuration status of the network graph represents the optimum display effect.

The hybrid layout algorithm: the layout process is disassembled into different steps or the layout area is partitioned into partial areas, and then different layout algorithms are utilized in different steps or in different partial areas, so that the requirements of layout are met in whole or locally.

Dynamic interactive layout algorithm: in practical applications the size and morphology of graphs will dynamically change with time, thus, it is required that the layout method is dynamically adapted to the change of graphs, and the layout shall be maximally maintained stable. Furthermore, single automatic layout can not meet power dispatchers' requirements. A recursive correction method is induced during the layout so that the layout effect is more close to power dispatchers' requirements. The key of the dynamic interactive layout is to efficiently utilize the result of the previous layout, so that the scale of single layout is reduced to improve efficiency, and the impression graph is maintained during the dynamic change of graphs.

Figure 2:
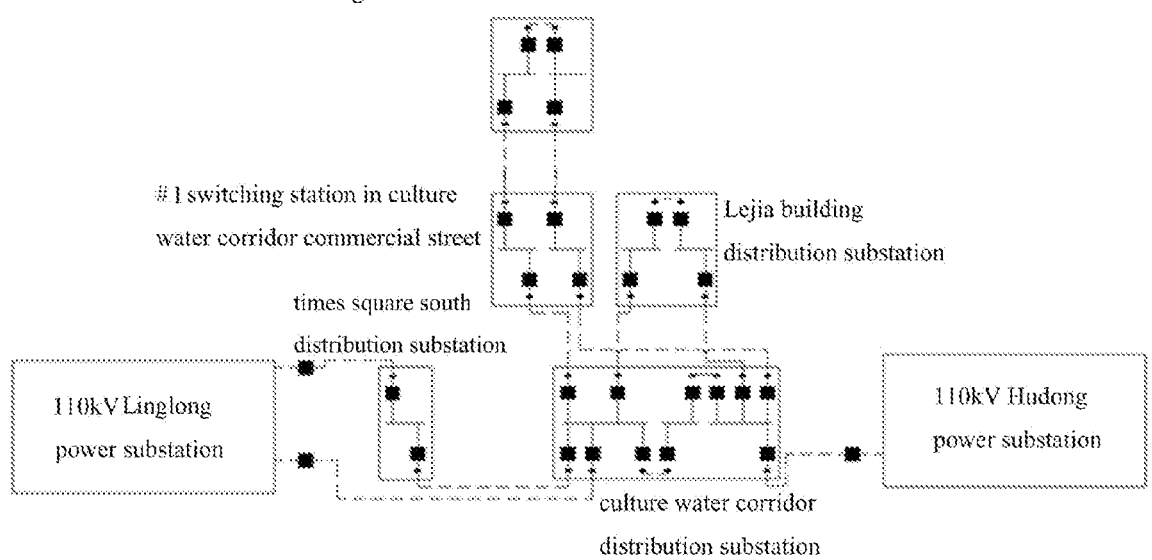
FIG. 2 is a schematic drawing of the distribution network graph generated by the automatic mapping method for a distribution network based on logical layout according to the invention.

The flow chart for generating the distribution network graph is shown in FIG. 1, and the effect example of the generated distribution network graph is shown in FIG. 2.

(5) analyzing and treating the automatic layout to achieve the generation of the distribution network graph with a desired practical effect.

There are many defects when the single layout algorithm is applied in a complicated distribution network, and the requirements of the distribution network can not be met. For example, in a force-directed algorithm, always there are nodes vibrating between two different locations such that the result of the algorithm is not convergent and an effective graph can not be generated. Meanwhile, when there are too many nodes for a network graph, it is very difficult to randomly select good initial nodes, thus, a graph with many intersections and overlapping will be generated, and satisfactory results can not be obtained. In the method of the present invention, multiple layout algorithms are combined with each other to avoid the defects of single algorithm. By pre-reading and pre-analyzing a model of the distribution network, the effective partition, backbone and branch striping are performed for the distribution network, the whole or partial layout algorithms are chosen preferably and intelligently, and effect weighting calculation is utilized for layout nodes to analyze initial layout effect. Secondary or multilevel recursive partitions and layouts are carried out for the graphs whose effect values do not reach the layout index, and finally the automatic mapping of a distribution network with a desired practical effect is achieved.

On-site engineering application: a corresponding CIM model is derived according to the on-site topology structure and then routing and layout are performed. An adapter can be added for the software systems based on construction, so that the software systems can embed into and integrate with other systems, and the layout service can be provided for other systems in various ways.

As described above, the detailed description is illustrated according to the spirit of the invention, but the invention is not limited to the aforementioned embodiments and implementing methods. Many variations and implements can be made within the scope of the invention by those skilled in the related art.

What is claimed is:
1. An automatic mapping method for a distribution network based on logical layout, for achieving automatic mapping of a distribution network graph of a power system, comprising the steps of:
  (1) identifying a layout model and executing a topology search analysis of a model of the distribution network according to the layout model to extract a plurality of partial models corresponding to the layout model;
  (2) defining pertinent automatic mapping algorithms as per an attribute of the extracted partial models;
  (3) achieving an automatic layout of the partial models on the basis of the pertinent automatic mapping algorithms and by combining with one or more of a force-directed layout algorithm, a dynamic interactive layout algorithm, and an improved grid routing algorithm in order to generate the distribution network graph, the automatic layout of the partial models including:
a layout for bus bars in switchgear;
a layout for main nodes;
a layout for branch nodes;
a layout for switchgear; and
a layout for bus bars and isolation switches; and
(4) analyzing and adjusting the distribution network graph such that a layout of the distribution network graph is consistent with a layout of actual distribution equipment.

2. The method as claimed in claim 1, wherein the method further comprises finding out the optimum common information model (CIM) model associated with the automatic layout on the basis of existing CIM models before analyzing and adjusting the distribution network graph.

\* \* \* \* \*